United States Patent [19]

Murashita

[11] Patent Number: 5,559,330
[45] Date of Patent: Sep. 24, 1996

[54] SCANNING TUNNELING MICROSCOPE

[75] Inventor: Toru Murashita, Kanagawa, Japan

[73] Assignee: Nippon Telegraph and Telephone Corporation, Japan

[21] Appl. No.: 359,193

[22] Filed: Dec. 19, 1994

[30] Foreign Application Priority Data

Dec. 20, 1993 [JP] Japan ..................... 5-320344
May 13, 1994 [JP] Japan ..................... 6-100103
Oct. 31, 1994 [JP] Japan ..................... 6-266656

[51] Int. Cl.$^6$ ..................................... H01J 37/00
[52] U.S. Cl. ........................... 250/306; 250/307
[58] Field of Search ......................... 250/306, 307, 250/492.2

[56] References Cited

U.S. PATENT DOCUMENTS

| | | | |
|---|---|---|---|
| 4,823,004 | 4/1989 | Kaiser | 250/306 |
| 5,099,117 | 3/1992 | Frohm et al. | 250/306 |
| 5,202,004 | 4/1993 | Kwak et al. | 250/306 |
| 5,289,004 | 2/1994 | Okada et al. | 250/306 |
| 5,376,790 | 12/1994 | Linker et al. | 250/306 |
| 5,410,151 | 4/1995 | Buckland | 250/306 |
| 5,410,910 | 5/1995 | Somlyo et al. | 250/306 |
| 5,485,536 | 1/1996 | Islam | 250/306 |

FOREIGN PATENT DOCUMENTS

| | | |
|---|---|---|
| 4-34824 | 2/1992 | Japan . |
| 4-77605 | 3/1992 | Japan . |
| 5-141961 | 6/1993 | Japan . |
| 6-74899 | 3/1994 | Japan . |

OTHER PUBLICATIONS

R. Berndt, R. Gaisch, W. D. Schneider, J. K. Gimzewski, B. Reihl, R. R. Schlittler and M. Tschudy, "Sub–nanometer lateral resolution in photon emission from C60 molecules on Au(110)", Surface Science 307–309 (1994) 1033–1037, pp. 1033–1037.

R. Berndt, R. R. Schlittler and J. K. Gimzewski, "Photon emission scanning tunneling microscope", J. Vac. Scl. Technol. B9 (2), Mar./Apr. 1991, 1991 American Vacuum Society, pp. 573–577.

R. C. Reddick, R. J. Warmack and T. L. Ferrell, "New form of scanning optical Microscopy", 1 Jan. 1989, The American Physical Society.

G. Binning and D. P. E. Smith, "Single–tube three–dimensional scanner for scanning tunneling microscopy", Rev. Sci, Instrum. 57 (8), Aug. 1986, 1986 American Institute of Physics, pp. 1688–1689.

Primary Examiner—Bruce C. Anderson
Attorney, Agent, or Firm—Blakely, Sokoloff, Taylor & Zafman

[57] ABSTRACT

A scanning tunneling microscope includes a probe, an optical waveguide, a photodetector, a bias power supply. The probe includes a tip made of a sharpened light transparent material and arranged to be opposite and perpendicular to a sample incorporating a quantum structure, and a light transparent electrode which covers a surface of the tip and is optically transparent. The optical waveguide has one end arranged on a proximal side of the tip. The photodector is arranged on the other end of the optical waveguide to detect luminescence from the sample. The bias power supply applies a bias voltage between the light transparent electrode and the sample.

27 Claims, 8 Drawing Sheets

SCANNING TUNNELING MICROSCOPE

BACKGROUND OF THE INVENTION

The present invention relates to a scanning tunneling microscope and, more particularly, to a scanning tunneling microscope (to be referred to as an STM hereinafter) which detects luminescence caused by electrons injected into, e.g., a material or a very small region in a structure embedded in a material, and measures the spectrum of the light or a spatial distribution image of luminescence corresponding to a detection position, thereby allowing observation of the characteristics of the small material or the very small region of the small structure with a high precision and a high resolution.

With the recent trend toward higher degrees of integration and higher speed of ICs, a rapid reduction in element size has been witnessed. Recently, great demands have arisen for realization of a so-called quantum-effect device, e.g., a high-speed, high-performance electronic device or optical device, as a circuit element of the next generation. Such a device is based on a quantum-mechanical effect obtained by confining particles such as electrons, holes, or excitons in a semiconductor structure (to be referred to as a quantum structure hereinafter) having a size on the nanometer order, which is almost equal to the size of such particles.

On the other hand, with the advances in the semiconductor crystal growth/process techniques, a structure having a size almost equal to that of the above particle having a size on the nanometer order can be formed. In a structure having such a small size, a particle exhibits a remarkable quantum effect. It is, therefore, expected that a quantum-effect device be realized by controlling/using such characteristics. Since the characteristics of a quantum-effect device are greatly influenced by the dimensional precision and characteristics of a quantum structure, in order to realize a good quantum-effect device, evaluation of a quantum structure is important.

Excitons confined in a quantum structure emit light having a spectrum sensitively reflecting a confined state. Therefore, measurement of this emission is an effective means for obtaining detailed information about the characteristics of the quantum structure.

In general, a quantum structure is formed by being surrounded by materials having different physical properties. For this reason, a quantum structure is often embedded in a sample.

As conventional methods and means of optically measuring a quantum structure by using luminescence from excitons, a photoluminescence (PL) method using light as a means for generating electron-hole pairs, a cathode luminescence (CL) method using high-energy electrons as a means for generating electron-hole pairs, a photon scanning microscope, and the like are available. However, these methods are insufficient for measurement of a very small region of a quantum structure for the following reasons.

In both the PL and CL methods, problems are posed in terms of exciton diffusion length and probe diameter (excitation beam diameter), resulting in a deterioration in spatial resolution.

More specifically, in both the PL and CL methods, excitons are diffused to places far away from an exciton generation place within a time interval between the instant at which they are generated and the instant at which they emit light. The range of diffusion is equivalent to a spread of a submicron or more. This makes it difficult to improve the spatial resolution. In addition, since excitons tend to be diffused to a region having a lower energy (thicker quantum structure) than a place where they are generated, the intensity of luminescence from a thick quantum structure is inevitably increased. That is, an emission distribution does not always reflect a thick distribution accurately.

The influences of an excitation beam diameter will be described next.

In the PL method, visible light or infrared light having a longer wavelength than visible light is generally used as excitation light. The wavelength of such light is about 0.5 to 1 μm. For this reason, the spot size of this excitation light cannot be reduced to a value smaller than the wavelength of the light. In addition, in consideration of a spread caused by factors based on the arrangements of other units, it is difficult to set the beam diameter on the micron order in practice.

In the CL method, since the electron energy is high, electrons are scattered in a sample over a wide range, and the scattered electrons also generate electron-hole pairs. For this reason, even if the electron beam diameter is reduced, it is difficult to reduce a region (generation volume) in which electron-hole pairs are generated. In addition, since a high energy and a large current are concentrated on a measurement region, the measurement may deteriorate or change in state.

As described above, in these methods, since the exciton diffusion length or the excitation beam diameter is large, it is difficult to improve the spatial resolution beyond the submicron order. Therefore, the methods cannot be applied to measurement of a very small region on the nanometer order.

Under these circumstances, an STM has been developed as a means for injecting an excitation beam into a very small region and measuring luminescence from this region.

A photon scanning microscope as another means for optically measuring a very small region is designed to detect light (evanescent light) locally existing at a place very near a sample surface with a transparent probe, which light is produced by excitation light emitted from a laser source different from the probe (R. C. Reddick, R. J. Warmack, and T. L. Ferrell, "New Form of Scanning Optical Microscopy", Phys. Rev. B39, pp. 767–770 (1989)). Since this instrument does not use injection of electrons into a sample, the probe is made of a glass material selected in consideration of only transparency while conductivity is neglected. In general, a light transparent material which can be used for a structure like a probe has good insulating properties but has no mechanism for supplying a current to a probe tip. In addition, as a modification of the photon scanning microscope, a photon scanning microscope using a tunnel current to control the distance between a sample and the probe is also available. In this instrument, a metal is deposited on the surface of the probe having good transparency to a thickness enough for shielding light, and a very small opening is formed in the tip of the probe to detect light entering through the opening. The instrument uses a tunnel current only for measurement/control of the distance between the probe and a sample surface, and the tunnel current does not contribute to luminescence. In addition, since the spatial resolution of measurement is determined by the size of the opening of the probe tip, the opening cannot be expanded, resulting in a very low light collection efficiency. In the photon scanning microscope, a region where measurement can be performed is theoretically limited to a place very near a sample surface. It is, therefore, impossible to evaluate a quantum structure.

This STM uses the property that a tunnel current injected from the probe of the STM into a sample concentrates on a very small region in the sample. In the STM, electrons are injected from the probe tip into a sample surface upon tunneling through a small spatial distance. Since the energy of tunneling electrons is much lower than that of an electron beam used by an electron microscope, electron-hole pairs can be generated to cause luminescence in a very small region.

In a conventional STM, however, since the probe is used to only supply tunneling electrons, the probe is just a metal lump and does not have a function of collecting light. A reflecting mirror arranged separately from the probe serves as a means for collecting emitted light. Since light radiated from a sample surface almost in accordance with the cosine law, light radiated in a direction perpendicular to the sample, i.e., the direction of the probe, has the highest intensity. According to the conventional structure, since this light portion having the highest intensity is shielded by the probe and cannot be used, the ratio of light which can be collected is low. Consequently, detected light is weak, and the signal-to-noise ratio is low. It is, therefore, difficult to perform high-precision measurement.

As described above, the photon scanning microscope cannot be theoretically used for optical evaluation of a quantum structure, whereas a required spatial resolution cannot be obtained in performing optical evaluation of a quantum structure by using the PL and CL methods. The STM is capable of measuring a quantum structure. However, with the conventional arrangement, a photodetection signal is weak, and high-precision measurement is difficult to perform. Therefore, it is difficult to measure the optical characteristics of a very small region of a quantum structure with a high precision and a high sensitivity by using any of the conventional instruments.

SUMMARY OF THE INVENTION

It is, therefore, a principal object of the present invention to provide a scanning tunneling microscope having optical characteristics which exhibit higher precision and higher resolution than a conventional instrument.

It is another object of the present invention to provide a multilayer structure evaluation method and apparatus which use a scanning tunneling microscope superior to a conventional one.

In order to achieve the above objects, according to an aspect of the present invention, there is provided a scanning tunneling microscope comprising a probe including a tip made of a sharpened light transparent material and arranged to be opposite to a sample incorporating a quantum structure, and a light transparent electrode which covers a surface of the tip and is optically transparent, an optical waveguide having one end arranged on a proximal side of the tip, a photodector, arranged on the other end of the optical waveguide, for detecting luminescence from the sample, and bias power supply means for applying a bias voltage between the light transparent electrode and the sample.

According to another aspect of the present invention, there is provided a measurement method comprising the steps of using a scanning tunneling microscope including a probe including a tip made of a sharpened light transparent material and arranged to be opposite to a sample, and a light transparent electrode which covers a surface of the tip and is optically transparent, an optical waveguide having one end arranged on a proximal side of the tip, a photodector, arranged on the other end of the optical waveguide, for detecting luminescence from the sample, and bias power supply means for applying a bias voltage between the light transparent electrode and the sample, causing a tunnel current to flow in the sample by applying a bias voltage from the bias power supply means to a portion between the light transparent electrode and the sample while the tip is set to oppose the sample perpendicularly, and guiding luminescence caused by the quantum structure, which has received the tunnel current, from the tip of the probe to the photodetector via the probe.

According to still another aspect of the present invention, there is provided a scanning tunneling microscope comprising an optical fiber having a sharp tip on one end, a light transparent electrode covering a surface of the tip, and electron injection means for producing a potential difference between the light transparent electrode and a sample, wherein luminescence caused in a quantum structure incorporated in the sample by injection energy of electrons injected into the sample by the electron injection means is guided from the light transparent electrode into the optical fiber.

According to still another aspect of the present invention, there is provided a probe comprising a tip made of a sharpened light transparent material and arranged to be opposite and perpendicular to a sample incorporating a quantum structure, and a light transparent electrode which covers a surface of the tip and is optically transparent.

DESCRIPTION OF THE PREFERRED EMBODIMENTS

Preferred embodiments of the present invention will be described in detail with reference to the accompanying drawings.

Figure 1:
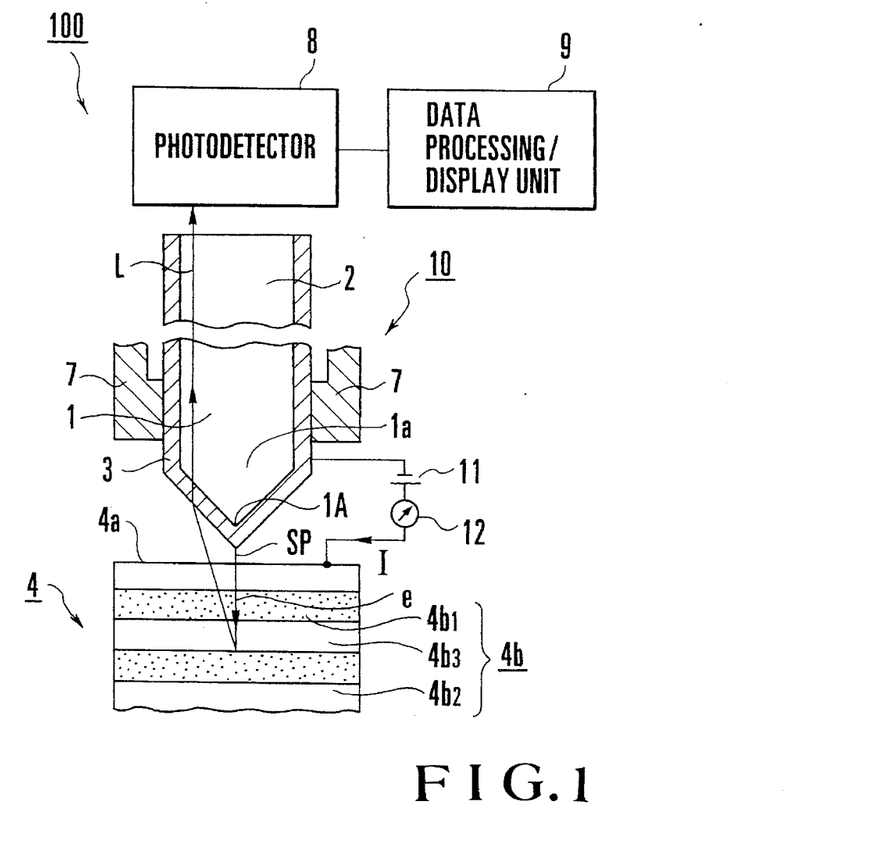
FIG. 1 is a view showing the arrangement of a scanning tunneling microscope according to an embodiment of the present invention.
Figure 4:
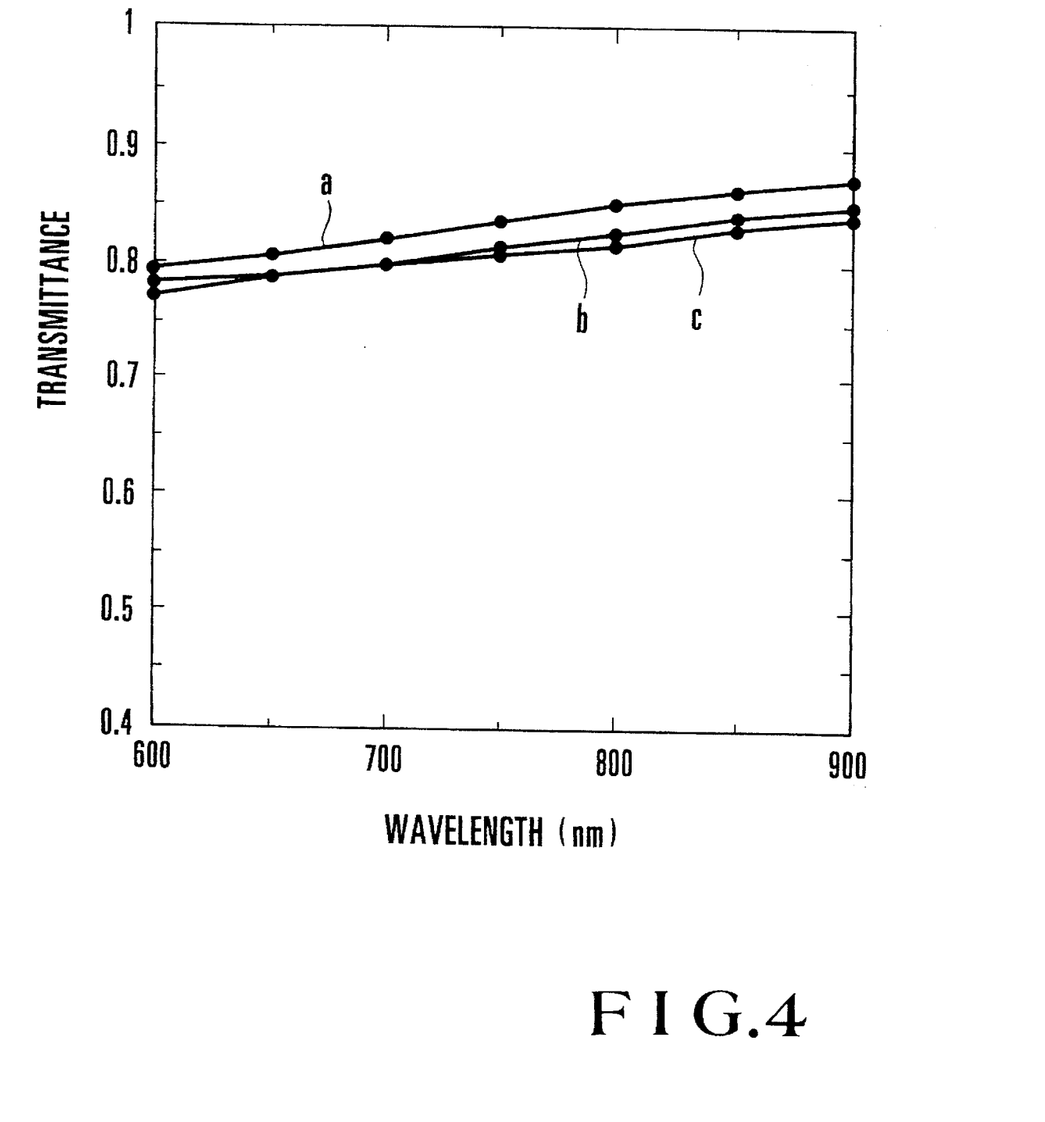
FIG. 4 is a graph showing the transmittance characteristics of light transparent, conductive, thin films, each coated on the tip of a probe in FIG. 1.

FIG. 1 shows a scanning tunneling microscope 100 according to an embodiment of the present invention. Referring to FIG. 1, reference numeral 1 denotes a probe base member made of a light transparent material such as an optical fiber or a glass material and having a conical tip 1a; and 2, an optical waveguide arranged to be adjacent to the proximal end of the probe base member 1. The optical waveguide 2 is made of a light transparent material having a sufficient mechanical strength such as an optical fiber or a glass rod. The diameter of the optical waveguide 2 is equal to or larger than that of the probe base member 1. Reference numeral 3 denotes a light transparent electrode formed by making a single metal, e.g., gold, tungsten, platinum, or aluminum, to adhere to a surface including the tip of the light transparent probe base member by a known method such as vapor deposition or plating. In this case, the light transparent electrode 3 is formed to have a thickness of about 20 nanometers or less so that light can be transmitted through the above single metal. Since the tip 1a has a conical shape, it has a lens function for light emitted from a sample (to be described later). Of these members, the probe base member 1 and the light transparent electrode 3 constitute a light transparent probe 10 as a characteristic feature of the present invention. Note that FIG. 4 shows the transmittance characteristics of light transparent, conductive films, as light transparent electrodes, coated on the tip of the light transparent probe 10. Referring to FIG. 4, the abscissa represents the wavelength; and the ordinate, the transmittance. Characteristic curves a, b, and c respectively indicate the measurement values based on the three light transparent, conductive films formed under the same vapor deposition condition. Each film is formed with good reproducibility to exhibit a transmittance of 76% or more.

Reference numeral 4 denotes a sample placed below the light transparent probe 10 to which the light transparent electrode 3 adheres; 4a, a surface of the sample 4; and 4b, a quantum structure formed in the sample 4. In this case, the quantum structure 4b is constituted by upper and lower barrier well layers 4b1 and 4b2 and an intermediate well layer 4b3. Reference numeral 7 denotes a probe driving mechanism mounted around the light transparent probe 10 and designed to vertically move the light transparent probe 10. The probe driving mechanism 7 includes an electrostrictive element such as a piezoelectric element and drives this element to move the light transparent probe 10 vertically (and horizontally, if required), thereby finely adjusting the distance between the light transparent probe 10 and the sample 4. As this probe driving mechanism 7, a known mechanism like the one disclosed in G. Binning et al., D. P. E. Smith, Rev. Sci. Instruc. pp. 1688–1689 (1986) can be used without any modification.

Reference numeral 8 denotes a photodetector arranged to be adjacent to the optical waveguide 2. The photodetector 8 receives light L, which is emitted from the quantum structure 4b when electrons e are injected into the sample 4, via the light transparent electrode 3, the light transparent probe 10, and optical waveguide 2. Reference numeral 9 denotes a data processing/display unit for analyzing, displaying, and recording an output signal from the photodetector 8.

Reference numeral 11 denotes a bias power supply for applying a voltage between the light transparent electrode 3 of the light transparent probe 10 and the sample 4; and 12, a tunnel current detector. Upon this voltage application, a tunnel current having a predetermined value flows in the direction indicated by the arrow in FIG. 1 via the tunnel current detector 12. At the same time, the above electrons e are injected from the light transparent electrode 3 into the sample 4.

The operation of the STM shown in FIG. 1 will be described next.

First of all, the probe 10 is placed near the surface of the sample 4. The bias power supply 11 then applies a bias voltage between the probe 10 and the surface of the sample 4 such that the probe 10 has a negative potential with respect to the surface 4a of the sample 4. The distance between the probe 10 and the surface of the sample 4 is controlled by using the probe driving mechanism 7 such that a tunnel current having a predetermined value is detected by the tunnel current detector 12. At this time, a predetermined tunnel current is radiated from a vertex portion 1A of the tip 1a of the probe 10 toward the surface 4a of the sample 4 via a space SP, and the electrons e are injected into the sample 4. In this case, the space SP between the probe 10 and the sample 4 may be a vacuum, a gas, a liquid, or the like as long as it has insulating properties allowing stable tunneling and sufficient transparency allowing photometry.

The electrons e injected, as a tunnel current, into the sample 4 travel straight within the sample 4 by a certain distance. If the quantum structure 4b is present inside the distance, electrons reach the quantum structure 4b. Electrons and holes in the quantum structure 4b are excited, and excitons are formed eventually. After the lapse of a predetermined period of time, the excitons emit energy when the electrons and the holes are recombined with each other and extinct, thereby emitting the light L.

The spectrum of the energy, intensity, or the like of the light L faithfully reflects the state of the quantum structure 4b so that the size or the like of the quantum structure 4b can be measured from the emission spectrum with a spatial resolution on the atomic order. Since this light L is emitted from the surface 4a of the sample 4 almost in accordance with the cosine law, the intensity is maximized in a direction perpendicular to the sample 4, i.e., the direction of the probe 10.

The probe 10 as a characteristic feature of the present invention is arranged to be transparent and perpendicular to the light L. Therefore, the probe 10 can efficiently collect light in the direction in which the intensity is maximized, and guide the light to the probe base member 1.

The light L, which is transmitted through the light transparent electrode 3 and incident on the probe base member 1 in the probe 10, propagates in the optical waveguide 2 and is guided to the photodetector 8 with almost no attenuation. The light which is incident on the photodetector 8 is converted into an electrical signal for each wavelength by a spectroscope, a photoelectric converter, and the like incorporated in the photodetector 8. Proper signal processing of each signal is then performed in the photodetector 8. The processed signals are supplied to the data processing/display unit 9, as needed.

The position of the probe 10 is fixed at a point on the sample 4, and luminescence is measured. With this operation, a very small region near the point can be measured in detail.

The probe 10 is moved on a plane parallel to the surface 4a of the sample 4 to scan the sample 4, and luminescence L is measured in correspondence with each scanning position. With this operation, the optical characteristics of the quantum structure 4b of the entire sample 4 can be continuously measured. For example, the optical characteristics are associated with the spatial distribution of the thickness of the quantum structure 4b of the sample 4.

In this manner, injection of a tunnel current and introduction of measurement light are coaxially performed to allow optical evaluation of a quantum structure in a sample with a high spatial resolution and a high sensitivity.

Although the above operation is associated with a case wherein the present invention is applied to the quantum structure 4b, the present invention can be equally applied to optical evaluation of a material itself or a material surface other than a quantum structure.

As is apparent, the present invention can be used, as a conventional STM, for detection of a surface structure and the like as well as measurement of optical characteristics.

As described above, a single metal which is not light transparent, e.g., gold, tungsten, or platinum, is formed into a thin film to increase the transmittance, and the film is used as a material for a transparent electrode. In this case, as described above, in order to ensure a required transmittance, the film must be as thin as several tens of nanometers. However, silica, ZnO, and SnO as main materials for a fiber used as the probe base member 1 are difficult to be soaked, i.e., exhibit low wettability with respect to a metal. For this reason, if a metal is deposited on a fiber surface very thinly, the metal becomes granulated, and sufficient conductivity cannot be ensured. In order to satisfy both the requirements for conductivity and transmittance, a light transparent electrode having the following structure may be used.

First of all, a material which is firmly combined with silicon and considerably higher in transmittance than a single metal is deposited, as a material for the light transparent electrode 3, on a fiber surface. In this embodiment, indium oxide is used as such a material for the light transparent electrode 3. However, other conductive, light transparent, thin films may be used without losing generality. Since indium oxide has good transparency, sufficient conductivity can be obtained with good reproducibility. Therefore, a strong light transparent electrode 3 which satisfies both the requirements for conductivity and transparency can be formed. If, however, indium oxide is used as the probe base member 1 for injecting a tunnel current, since indium oxide is a compound consisting of a plurality of types of atomic species, it is difficult to specify the state of atoms of the tip 1a of the probe base member 1 which determines tunnel current characteristics.

For this reason, in order to guarantee that the type of atom of the tip 1a of the probe base member 1 always coincides with a state, a single metal (e.g., gold, tungsten, platinum, or aluminum, which is used for a general STM probe) must be made to adhere to at least the tip 1a, of the probe base member 1, from which a tunnel current is emitted. Since a tunnel current required for an operation is supplied from the bias power supply 11 via the conductive, light transparent film, the signal metal may be very thin. As described above, by coating the surface of the conductive, light transparent, thin film of the tip portion of the probe 10 with a single metal having a thickness falling within a range in which the required transparency is not lost, a probe having a specified type of atom adhering to its tip can be realized. This metal coating may be formed at at least the very small vertex portion 1A, of the tip 1a of the probe base member 1, from which a tunnel current is emitted. However, various modifications of this embodiment may be made depending on manufacturing methods.

Figure 2:
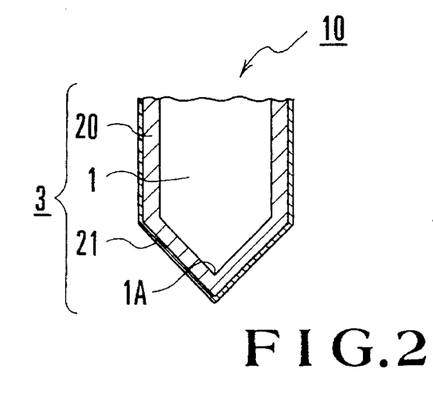
FIG. 2 is a sectional view showing a modification of the embodiment of the present invention.

FIG. 2 shows one modification of the above embodiment. In this modification, a metal thin film 21 is deposited on the entire surface of a conductive, light transparent, thin film 20 such as an indium oxide film, formed on the surface of the probe base member 1 constituting the probe 10, to have a thickness falling within a range in which the required transparency is not lost. This structure can be easily realized by performing general deposition of a single metal from the direction of the tip 1a of the probe base member 1. The modification is advantageous in mass-producing inexpensive probes 10 with uniform quality.

Figure 3:
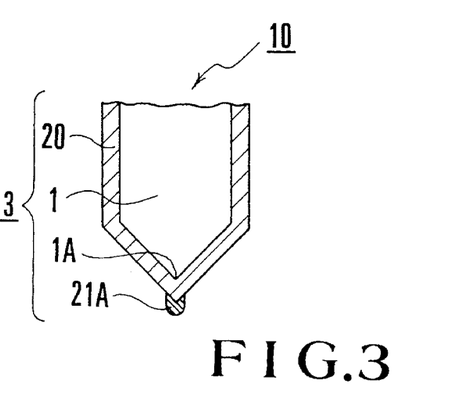
FIG. 3 is a sectional view showing another modification of the embodiment of the present invention.

FIG. 3 shows another modification of the embodiment. The difference between the modification shown in FIG. 3 and that shown in FIG. 2 is that a metal thin film 21A is formed on only the vertex portion 1A of the probe 10. The metal thin film 21A can be deposited on only the tip 1a of the probe base member 1 in this manner by vapor deposition using, e.g., a metal beam. The tip of the probe 10 can be sharpened into a needle-like shape. Since accurate positioning of a deposition position and the like are required, it is slightly difficult to manufacture this probe. However, the overall transmittance can be increased because no metal coating is formed except for a portion near the tip. In addition, since the tip can be sharpened, the probe can be used for measurement of a sample having a rough surface.

As is apparent from the above description, according to the present invention, the optical characteristics of a very small region of a quantum structure embedded in a sample can be measured with a very high spatial resolution and a high sensitivity. Therefore, a high-performance scanning tunneling microscope, which could not be realized in the prior arts, can be realized.

In addition, since the structure of the present invention can be realized by only changing part of the arrangement of a conventional microscope of the same type, the microscope of the present invention is economically and functionally advantageous.

Furthermore, the microscope of the present invention has the same function as that of a conventional scanning tunneling microscope as well as the function of measuring the optical characteristics of a quantum structure. Therefore, the microscope of the present invention can be used for optical evaluation of a sample itself or a sample surface as well as a quantum structure. That is, the microscope of the present invention exhibits excellent versatility, adaptability, functionality, and utility.

Figure 5:
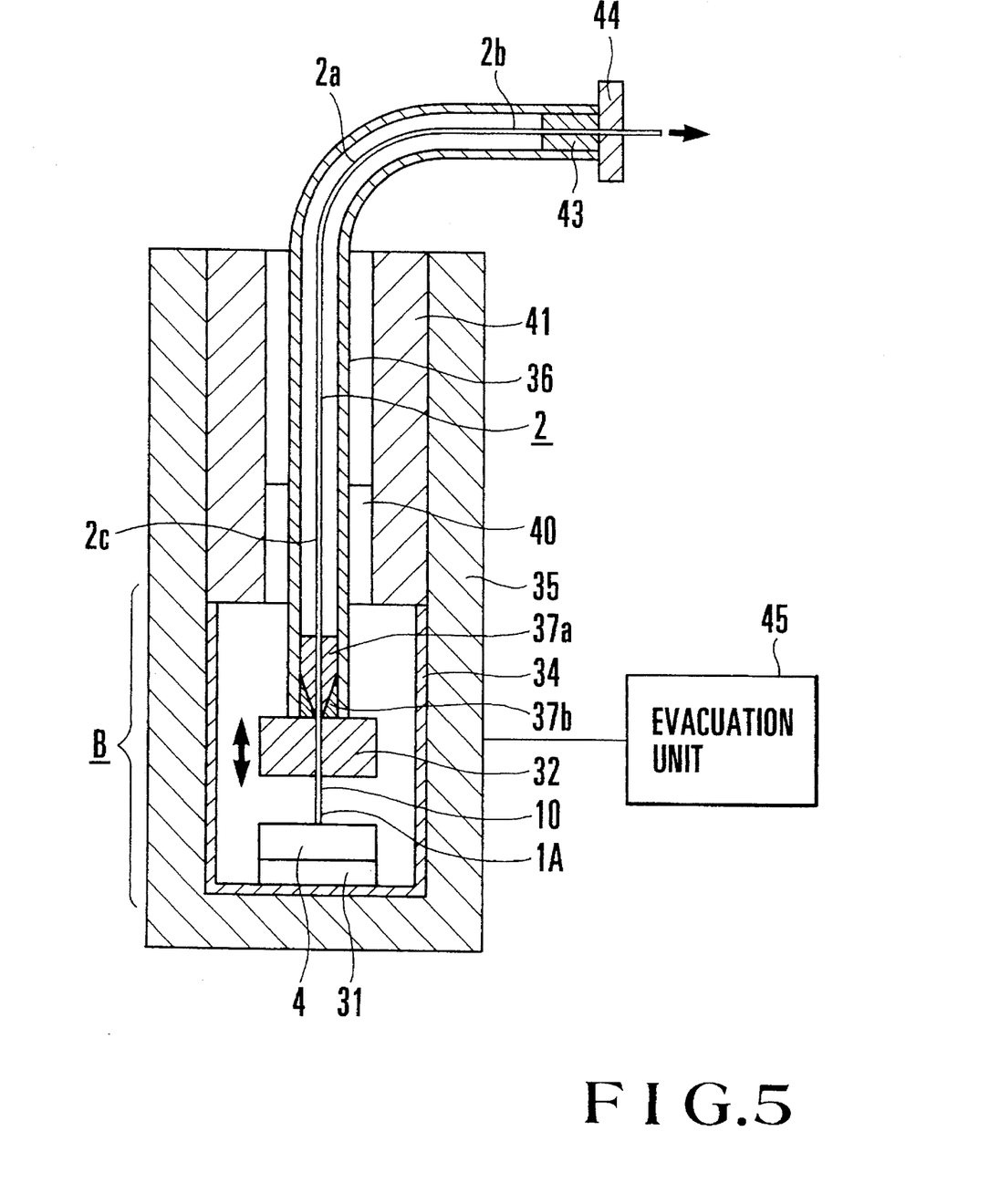
FIGS. 5 to 7 are views showing the arrangement of another embodiment of the present invention.

FIG. 5 shows another embodiment of the present invention. When a probe 10 is moved vertically, a stress acts on an optical fiber between the probe 10 and a photodetector 8. As a result, the probe 10 cannot be accurately driven. This embodiment is made to solve such a problem. The same reference numerals in FIG. 5 denote the same parts or parts having the same functions as in FIG. 1. Referring to FIG. 5, reference numeral 31 denotes a sample stage on which a sample 4 is placed; 32, a probe driving mechanism for holding the probe 10 and moving the probe 10 in the (vertical) direction indicated by the arrows in combination with a piezoelectric element and the like (not shown); 34, a cooling means 34; and 35, a vacuum vessel.

Reference numeral 36 denotes an elbow tube bent to have a large radius of curvature. An optical transmission fiber 2 as an optical waveguide is arranged in the elbow tube 36 to have a large radius of curvature. This elbow tube 36 is bent along the bent portion of the fiber 2. The inner diameter of the elbow tube 36 is set such that the inserted fiber 2 is not brought into contact with the inner wall of the elbow tube 36 when the fiber 2 is elastically deformed upon vertical movement of the probe 10. A movable anchor spacer member 37a and a bearing seat 37b are arranged in one end of the elbow tube 36. These member serve to slidably support the fiber 2 while the fiber 2 is positioned to the probe 10. This movable anchor spacer member 37a is arranged to be slidably movable inside the elbow tube 36 while causing the distal end of the fiber 2 to extend through the axial center of the elbow tube 36. The distal end of the movable anchor spacer member 37a has a columnar shape with a small diameter. A portion of the movable anchor spacer member 37a which changes its diameter is tapered. In this embodiment, the bearing seat 37b is shaped such that the bearing seat 37b is fitted in the inside of the distal end of the elbow tube 36. A tapered portion of the bearing seat 37b serves to allow the movable anchor spacer member 37a to smoothly move to a preset position to automatically set its axial center, when it is inserted from the distal end of the elbow tube 36. In this state, the movable anchor spacer member 37a is not moved in the radial direction but can be smoothly moved in only the vertical or axial direction. When the probe fixed to a holding member is mounted on the probe driving mechanism, the proximal end of the probe is brought into contact with the movable anchor spacer member 37a to form an optical transmission path. In this case, the movable anchor spacer member 37a has a degree of freedom in smoothly moving in only the vertical direction. In practice, therefore, the proximal end of the probe slightly pushes the movable anchor spacer member 37a upward. As a result, the contact surfaces are brought into tight contact with each other. In addition, even if the position of the proximal end of the probe is slightly shifted in the vertical direction, the contact surfaces can be brought into tight contact with each other with the same force. In addition, according to this structure, since the probe 10 and the fiber 2 abut again each other, a stress on the fiber 2 side is not transferred to the probe 10. If the movable anchor spacer member 37a and the bearing seat 37b are made of an insulating material, a leakage current flowing through the fiber 2 can be prevented. As this material, a ceramic material or the like is preferable because it does not contaminate a vacuum in the vacuum vessel 35 and is not damaged by cooling.

Reference numerals 41 and 42 denote seal members for supporting the elbow tube 36 and vacuum-sealing a space between the sample 4 and the probe 10 to form a sealed measurement chamber B.

Reference numeral 43 denotes a stationary anchor spacer member fitted in a fiber extraction opening on the proximal end of the elbow tube 36. The fiber 2 extends through the axial center of the stationary anchor spacer member 43 to be extracted outside. Reference numeral 44 denotes a vacuum-sealing member mounted on the proximal end of the elbow tube 36. The fiber 2 is introduced to the photodetector 8 (not shown) located outside via the vacuum-sealing member 44.

The probe 10 is fixed to the probe driving mechanism 32. The vertex portion 1A of the probe 10 is placed to oppose the sample 4. The probe 10, the probe driving mechanism 32, and the sample 4 are surrounded by the cooling means 34 to be cooled to a predetermined low temperature. In order to prevent surface contamination, the probe 10, the probe driving mechanism 32, the sample 4, and the cooling means 34 are all housed in the vacuum vessel 35 in which an ultra-high vacuum is kept by an evacuation unit 45 communicating with the sealed measurement chamber B.

The space around the probe driving mechanism 32 is very narrow and set in an almost closed state to improve the cooling effect and prevent surface contamination. The distal end of the fiber 2 is located to be adjacent to the proximal end of the probe 10 in an aligned state. With this arrangement, light is guided to the photodetector 8 including an optical processing means, i.e., a spectroscope and the like, arranged outside the vacuum vessel 35, via the fiber 2.

According to the above arrangement, since the fiber 2 as an optical wave guide is bent to have a large radius of curvature, vertical movement of the fiber 2 is not interfered by vertical movement of the probe 10. Therefore, the measurement position of the probe 10 can be easily and accurately adjusted. In addition, the probe 10 can be vertically moved over a relatively long distance without impairing a high-precision probe driving operation.

In brief, the point of the embodiment shown in FIG. 5 is that the transmission fiber has a bent portion with a large radius of curvature. A criterion for this radius of curvature will be described below.

If the radius of curvature of the fiber 2 is too small, a large shearing force acts on the fiber at portions near the two ends of the fiber 2 at which the fiber 2 is fixed. As a result, fracture of the fiber 2, distortion of the probe driving portion, or the like may occur. In contrast to this, if the radius of curvature is too large (close to a straight line), the amount of change in mechanical stress on the transmission fiber 2 upon movement of the probe increases. As a result, a desired effect cannot be obtained. The radius of curvature of the fiber is determined such that shearing forces acting on the two ends of the fiber become almost constant within the range of the vertical moving distance of the probe which is required for the optical STM apparatus. With such a radius of curvature, the absolute value of the shearing force is small. In general, a radius of curvature of about 10 to 20 cm is set for a fiber having a diameter of 400 μm. The radius of curvature of a fiber with which such a desired effect can be obtained is not strictly specified but falls within a relatively wide allowable range. This is an advantage in practice.

Referring to FIG. 5, in such a bent state, the fiber 2 is not arcuated as a whole, but an arcuated portion 2a is formed in the middle of the fiber 2 and straight portions 2b and 2c are formed before and after the arcuated portion 2a. The fiber 2 may be used in a state wherein the length of each of the straight portions 2b and 2c is ½ or more the radius of the arcuated portion 2a. If, however, the straight portions are too long, flexure and shaking of the fiber increase to increase unnecessary mechanical vibrations. For this reason, an excessive increase in the length of each straight portion must be avoided. If a long straight portion is required, a support member needs to be arranged for the straight portion.

In the embodiment shown in FIG. 5, the movable anchor spacer member 37a and the cooling means 34 have not only a function of aligning the proximal end of the probe 10 with the distal end of the optical waveguide 2 but also a function of bringing them into contact with each other. As is apparent, the present invention is not limited to this structure as long as the same functions can be realized. For example, the shapes of the movable anchor spacer member 37a and the bearing seat 37b shown in FIG. 5 may be reversed, or a plurality of conical holes are formed in the bearing seat 37b and a plurality of conical projections are formed on the movable anchor spacer member 37a so that the two members can be coupled to each other. Alternatively, cross or radial grooves may be formed in the bearing seat 37b and cross or radial ridges may be formed on the movable anchor spacer member 37a so that the two members can be joined to each other.

Referring to FIG. 5, in order to supply a tunnel current to the probe 10, and a driving current to the probe driving mechanism 32, a wiring cable (not shown) may be introduced into the vacuum vessel.

Figure 6:
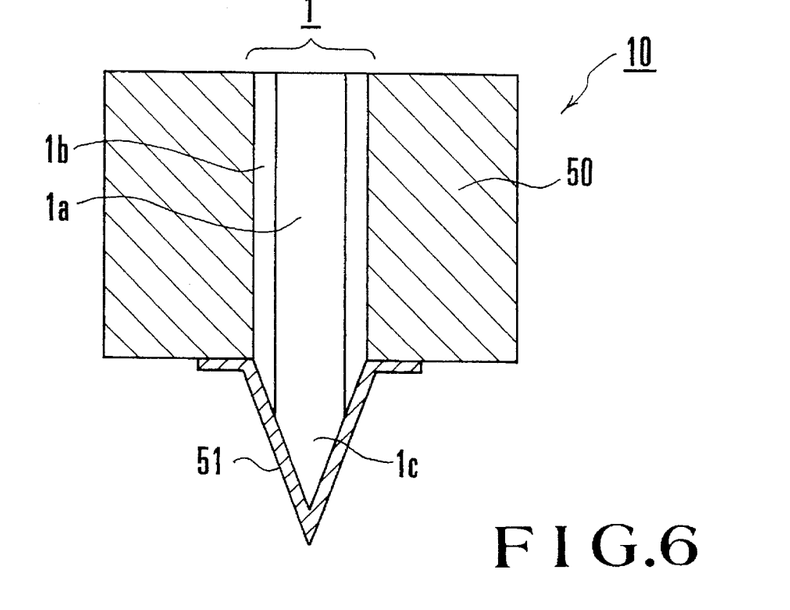
Figure 7:
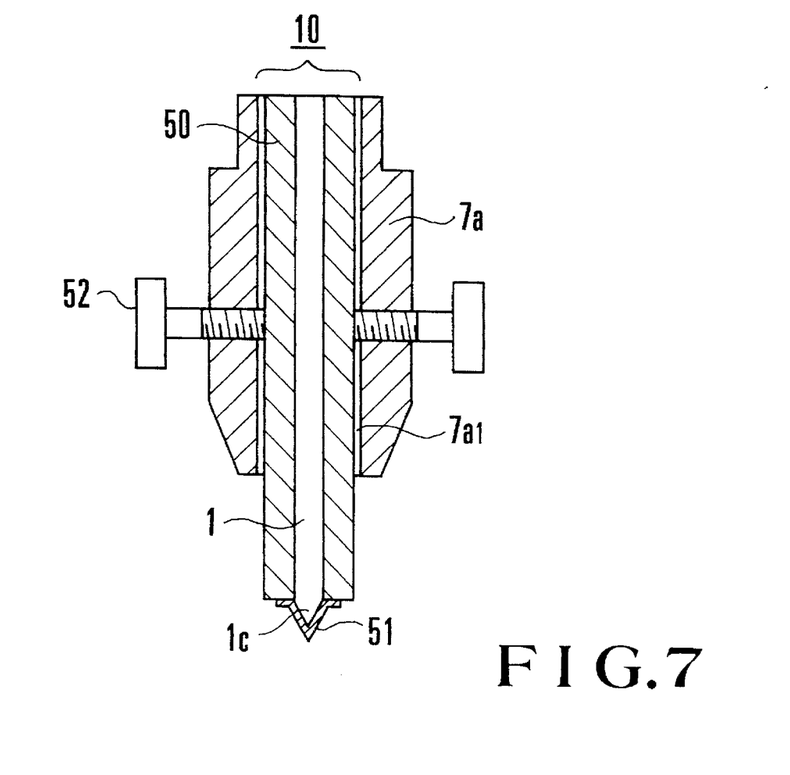
Figure 8:
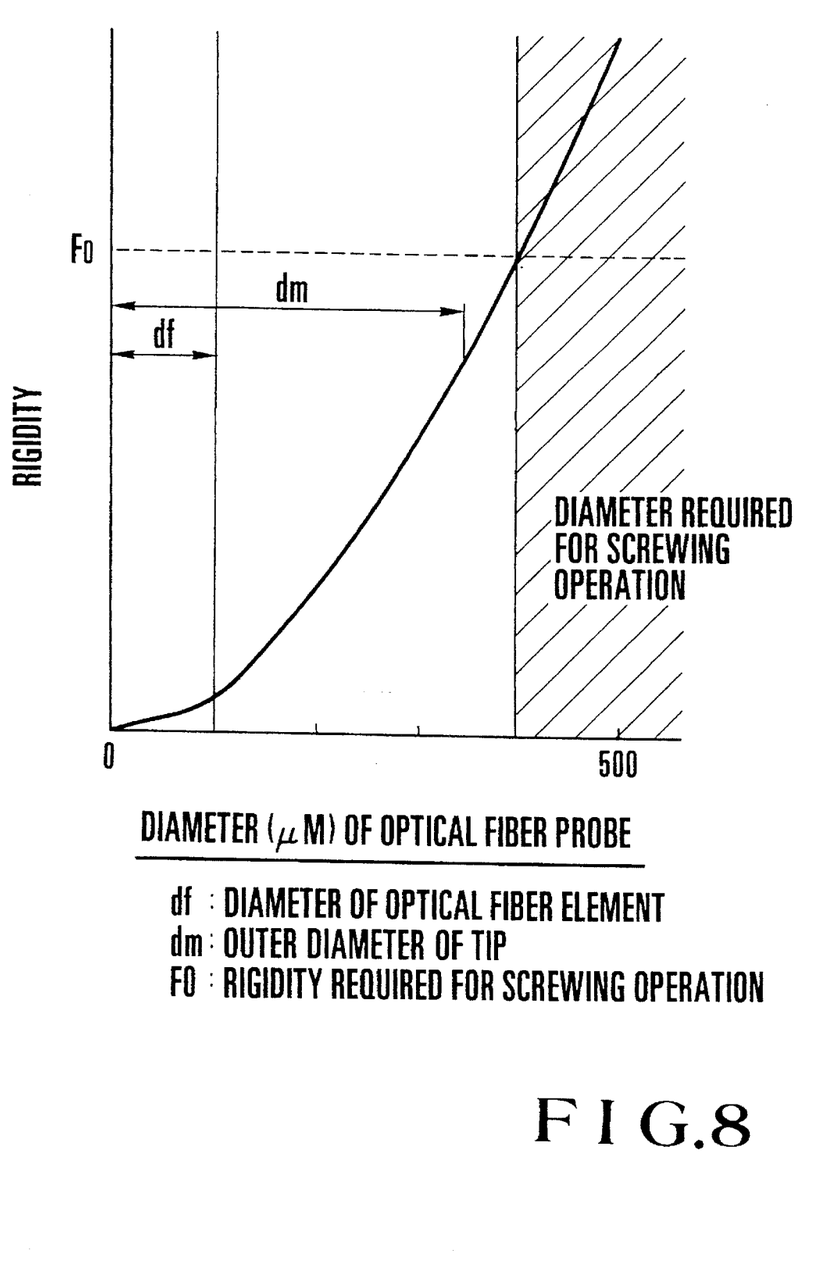
FIG. 8 is a graph showing the relationship between the diameter and rigidity of an optical fiber probe.

FIGS. 6 to 8 show still another embodiment of the present invention. This embodiment is associated with a replaceable probe structure. The embodiment will be described in detail below with reference to FIGS. 6 to 8. The same reference numerals in FIGS. 6 to 8 denote the same parts as in FIG. 1. Referring to FIG. 6, a probe base member 1 of a probe 10 is made of a single optical fiber having a certain length and consisting of a core 1a and a clad 1b. As shown in FIG. 6, the distal end of this optical fiber element 1 is formed to constitute a conical lens 1c. Reference numeral 50 denotes a conductive thick film plated on the outer surface of the optical fiber element 1 except for the conical lens 1c; and 51, a light transparent, conductive, thin film coated on the conical lens 1c of the optical fiber element 1. In this case, the outer diameter of the optical fiber element 1 is generally set to be hundred and several tens of μm. A case wherein a silica fiber having a diameter of 100 μm is used will be described below. However, this size is just an example, and the present invention is not limited to it.

In addition to plating, known adhesion methods such as vapor deposition are available as methods of coating the optical fiber element 1 with a metal. In this case, a plating method is employed, which can form a thick coating within a short period of time. Nickel is used as a metal to be plated. Other metals such as chromium, copper, and stainless steel are available as metals which can be plated on silica. However, the bonding strength between nickel and silica as a main component of the fiber is high so that a thick plating having a thickness of about several hundreds of μm can be relatively easily formed. For this reason, nickel is used.

Since this metal plating layer 50 also serves as a current path for connecting a probe holder 7a to the light transparent, conductive, thin film 51 which covers the conical surface of a tip 1c of the optical fiber element 1, a high conductivity is required for the conductive thick film 50.

The tip of the probe 10 of this embodiment needs to be processed to be capable of collecting light and be conductive. For this reason, plating must be performed in consideration of these processes. In the embodiment, plating is performed according to the following procedure.

The rigidity of the probe 10 is determined by the thickness of a plating layer. The rigidity increases almost in proportion to the cross-sectional area of the plating layer. The present inventor experimentally found that for a optical fiber element having a diameter of about 100 μm, the rigidity required to almost sustain a screwing operation could be obtained when the plating layer was made thick to increase the diameter to about 400 μm. Therefore, the thickness of a nickel plating layer may be about 150 μm or more in terms of rigidity.

A through hole must be formed in the probe holder 7a to allow the probe 10 to be inserted. The lower limit of the diameter of a hole which can be formed in a metal with high precision by using a general drill or the like is about 600 μm, provided that the depth of the hole is about 1 to 2 cm. A smaller hole can be formed by electrolytic polishing or the like. In this case, when high dimensional precision and linearity required for insertion of a fiber are to be obtained, the process yield is too poor to use this process for practical use. That is, the practical hole diameter is 600 μm or more.

Judging from these conditions of the plating thickness required to ensure rigidity and the hole diameter required for a high-precision process, a size of about 600 μm is practically suitable as the diameter of a hole and the diameter of the probe 10. A combination of a hole having a larger diameter and a probe having a larger diameter may be used. If, however, the diameter is too large, the dimensional precision of the plating diameter deteriorates, and the plating time is prolonged. In this case, plating is performed with respect to a fiber probe having a diameter of 100 μm until the diameter becomes 600 μm, and the probe is inserted into a hole, in a probe holder, which has a diameter of 600 μm. In practice, as is apparent, a tolerance is required between the diameter of a hole and the diameter of the probe 10 to allow insertion of the probe 10 without any backlash. In this case, however, the tolerance is neglected for the sake of descriptive simplicity.

The tip of the probe 10 of this embodiment needs to be processed to be capable of collecting light and be conductive. For this reason, plating must be performed in consideration of these processes. In the embodiment, plating is performed according to the following procedure.

First of all, the optical fiber element 1 is cut to have a relatively large length equal to the sum of a length required for the probe 10 and a length required for a fixing operation and the like in a process. A material serving as an electrode in a plating process is coated very thinly on the surface of the clad 1b. The coated optical fiber element 1 is dipped in a plating solution to plate the surface of the clad 1b (a side surface of the fiber) with nickel until the diameter of the optical fiber element 1 becomes almost equal to the diameter of the hole in the probe holder, which is 600 μm, thereby forming the conductive thick film 50.

In order to process the distal end of the plated optical fiber element 1 into a conical shape, a portion near the distal end of the optical fiber element 1 is dipped in an etching solution mainly consisting of an aqueous hydrogen fluoride solution. As a result, the distal end of the optical fiber element 1 is chemically etched into the conical lens 1c.

Subsequently, the light transparent, conductive, thin film 51 is deposited on the surface of the conical portion of the optical fiber element 1 to cover a portion ranging from the conical distal end to the end of the metal plating layer. The light transparent, conductive, thin film 51 is deposited within the range and the thickness in which the distal end of the conical lens 1c is electrically connected to the conductive thick film 50 formed by metal plating.

Finally, the optical fiber element 1 is cut to have a length, i.e., a length from the conical distal end, required for the probe 10; the cut surface is polished into an optical flat surface; and antireflection coating is performed as needed, thereby completing the probe 10.

Although the procedure for processing the probe 10 demands special consideration in this manner, a plating process itself is an easy, inexpensive process.

The relationship between the probe 10 and the probe holder 7a for fixing the probe 10 will be described next with reference FIG. 7. This probe holder 7a is formed as part of the probe driving mechanism 7 shown in FIG. 1.

FIG. 7 shows a state wherein the optical fiber probe 10 is fixed to the probe holder 7a. Referring to FIG. 7, reference numeral 7a1 denotes a hole formed in the probe holder 7a. The probe 10 of this embodiment is inserted into the hole 7a1 and fixed to the probe holder 7a by tightening a plurality of set screws 52 arranged around the probe holder 7a.

When the probe 10 is to be replaced, the probe 10 is fixed to the probe holder 7a in advance, and the probe 10 is detached/attached from/to the optical STM apparatus together with the probe holder 7a. This allows easy replacement of the probe even in a vacuum.

As shown in FIG. 7, the hole 7a1 in which the probe 10 is to be inserted must be formed in the probe holder 7a. The lower limit of the diameter of a hole which can be formed in a metal with a high precision by using a general drill or the like is about 600 μm, provided that the depth of the hole is about 1 to 2 cm. A smaller hole can be formed by electrolytic polishing or the like. In this case, when a high dimensional precision and linearity required for insertion of the probe 10 are to be obtained, the process yield is too poor to use this process for practical use. That is, the practical hole diameter is 600 μm or more.

Judging from these conditions of the plating thickness required to ensure rigidity and the hole diameter required for a high-precision process, a size of about 600 μm is practically suitable as the diameter of the hole 7a1 and the diameter of the probe 10. A combination of a hole having a larger diameter and a probe having a larger diameter may be used. If, however, the diameter is too large, the dimensional precision of the plating outer diameter deteriorates, and the plating time is prolonged. In this embodiment, therefore, plating was performed with respect to the probe 10 having an outer diameter of 100 μm until the diameter became 600 μm, and the probe 10 was inserted into a hole, in a probe holder, which had a diameter of 600 μm. In practice, as is apparent, a tolerance is required between the diameter of the hole 7a1 and the diameter of the probe 10 to allow insertion of the probe 10 without any backlash. In this case, however, the tolerance is neglected for the sake of descriptive simplicity.

The probe 10 which is plated with nickel to have a diameter of 600 μm has almost the same rigidity as that of a nickel wire having the same diameter. A shearing stress applied to the probe 10 is received by the metal plating layer 50. As a result, the overall prove becomes highly resistant to a shearing force and also becomes so hard that it cannot be bent without pliers. In this case as well, the optical fiber element is not broken. FIG. 8 shows the relationship between the rigidity of the probe 10, a thickness df of the optical fiber element 1, and a thickness dm of the metal plating layer 50. Referring to FIG. 8, reference symbol F0 denotes rigidity required for a screwing operation.

While the probe 10 is inserted in the hole 7a1 of the probe holder 7a, the probe is highly resistant to a shearing force so that the probe 10 can be directly fastened to the probe holder 7a with the screws 52. Therefore, mechanical fixing and electrical connection between the probe 10 and the probe holder 7a can be reliably performed. Even this probe 10 is repetitively cooled and heated between room temperature and a low temperature, the probe 10 can be stably operated and has sufficient resistance to a heat stress. In addition, since there is no material which contaminates a vacuum, no emission of a gas occurs even in an ultra-high vacuum, and a clean vacuum can be kept.

Note that the diameter of the optical fiber element 1, whose thickness is limited, can be changed by metal plating. Therefore, by making the diameter of the optical fiber element 1 coincide with that of a metal probe, both the optical fiber probe and the metal probe can be used with the same probe holder in the same STM apparatus.

As is apparent from the above description, according to this embodiment, a side surface or the entire surface of the optical fiber element 1 is coated with a metal layer within the range in which the thickness of the metal layer is 150 μm or more or the sum of the radius of the optical fiber element 1 and the thickness of the metal layer is 400 μm or more. With this process, reliable mechanical fixing and electrical connection required for a stable operation can be easily performed.

Figure 9:
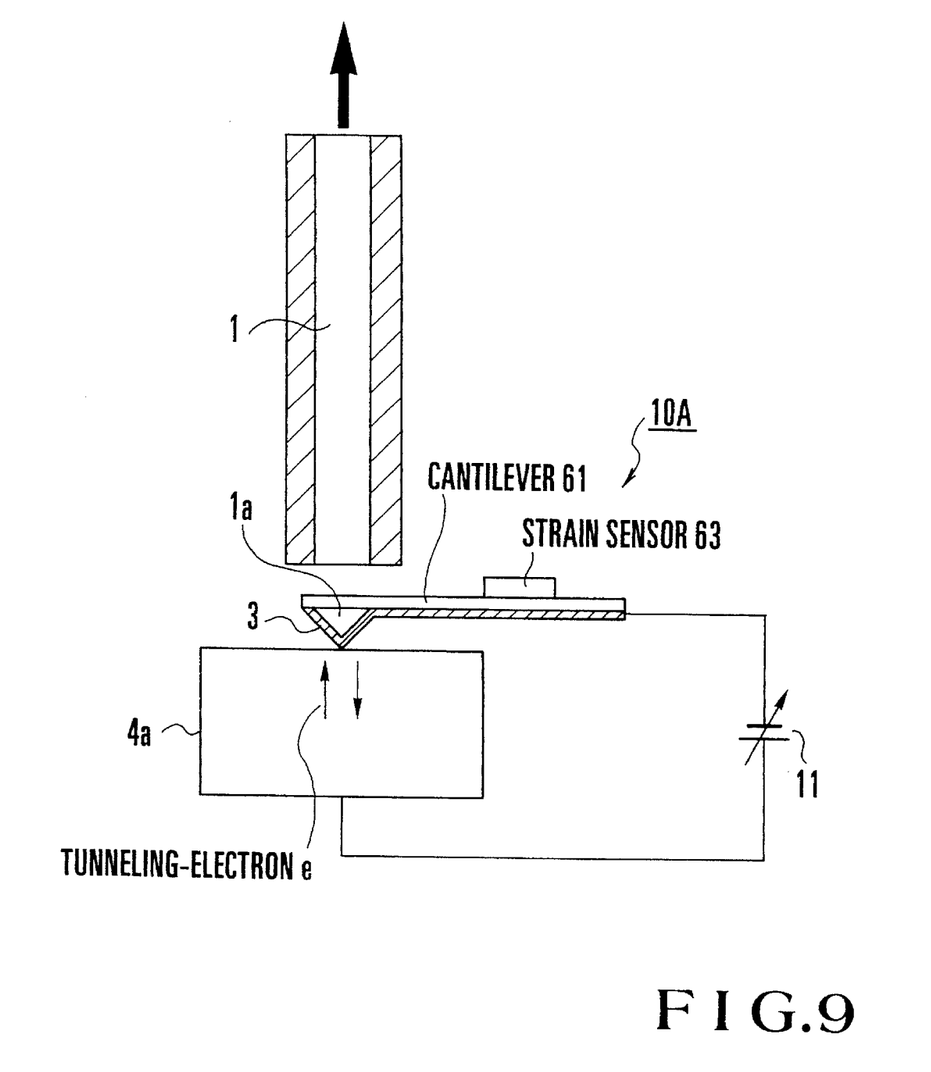
FIGS. 9 to 11 are views respectively showing the arrangements of other embodiments of the present invention.

FIG. 9 shows still another embodiment of the present invention. This embodiment is characterized in that only the tip of a probe 10 is made of a vertex portion 1A to be replaceable.

In the above embodiments, the conical lens 1A, which is obtained by coating the light transparent electrode 3 for injecting a tunnel current and collecting luminescence, and the columnar fiber base member 1 for fixing the probe 10 and supplying a current are integrated. This integral structure has been described above as the structure of the conductive, light-collecting probe. In this embodiment, however, a tip 1a of a conical lens is separated from a columnar fiber base member 1. This structure will be described below with reference to FIG. 9. Note that the same reference numerals in FIG. 9 denote the same parts as in the previous embodiments.

Referring to FIG. 9, the conical lens 1a is formed on the distal end of a cantilever 61. The conical lens 1a may be processed integrally with the cantilever 61, or may be fixed to the cantilever 61 with a light transparent adhesive after the conical lens 1a is independently manufactured. In this case, since the distal end of the cantilever 61 is integrated with or bonded to the conical lens 1a, both the adhesive and the cantilever need to be transparent to light. In this embodiment, the cantilever and the conical lens are integrated into one structure. This structure will be referred to as an AFM (atomic force microscopy (microscope)) probe 10A hereinafter. In the embodiment, the vertex portion 1A of the conical lens is located near or in contact with a surface 4a of a sample 4.

In this embodiment, a portion from the proximal end of the cantilever 61 to the distal end of the conical lens 1a is coated with a conductive member constituting a light transparent electrode 3. The proximal end of the cantilever 61 is fixed by a conductive jig (not shown) and is electrically connected to a bias power supply 11 via the jig. In addition, an AFM probe 10A is arranged such that the core of the optical transmission fiber element 1 is located immediately behind the conical lens 1a. An end face, of the optical transmission fiber element 1, located on the AFM probe side is polished into an optical flat surface or a lens-like surface to efficiently guide light incident from the AFM probe 10A on the optical transmission fiber element 1. Note that the optical transmission fiber element 1 is formed one of the following methods: ① a method of using one long fiber, and ② a method of replacing the conductive light transparent probe with the conical lens according to the above embodiment with an optical transmission fiber element of the same length, and connecting a long optical transmission fiber extending to a photodetection system to the proximal end of the fiber element. If the latter method is used, the apparatus of the present invention can be commonly used for both the arrangement for an STM operation using an STM probe and the arrangement for an AFM operation using an AFM probe.

The operation of this embodiment will be described below.

First of all, the AFM probe 10A is scanned over a sample 4. The cantilever 61 deflects in accordance with the corrugations of the surface 4a of the sample 4. This deflection amount is then measured by a strain sensor 63 mounted on the cantilever 61, thereby detecting the corrugations of the surface 4a.

When tunneling electrons e are injected from the vertex portion 1A of the conical lens 1a into the sample 4, tunneling electron luminescence is produced in the sample 4. The tunneling electron luminescence is collected by the conical lens 1a at the tip of the AFM probe 10A and is radiated from the proximal end of the lens toward the optical transmission fiber element 1. The luminescence is received by the optical transmission fiber element 1 to be guided to the photodetection system. The tunneling electron luminescence can be measured by performing spectroscopic processing of the luminescence or obtaining a spatial distribution of intensity.

In an STM operation, since there is a gap between the probe and the sample, and the distance is controlled by using a tunnel current, the sample surface needs to have conductivity. In contrast to this, in an AFM operation, since the probe-sample distance is not controlled by using a tunnel current but by measuring the deflection amount of the cantilever 61 based on an interatomic force, the apparatus can also be applied to a sample having an insulating surface. The AFM operation includes a contact mode, in which the tip of the AFM probe 10A is brought into contact with the surface of the sample 4, and a noncontact mode, in which the probe is not brought into contact with the surface of a sample. Both the modes can be applied to an insulating sample. The contact mode has an advantage over the noncontact mode in that a larger current can be made to flow. However, the measurement precision in the noncontact mode tends to be higher than that in the contact mode. Therefore, the contact mode or the noncontact mode may be selected depending on measurement conditions.

According to the embodiment shown in FIG. 9, the conical lens portion is separated from the columnar fiber base member, and the conical lens and the cantilever are integrated into the AFM probe structure. With this structure, an AFM operation can be performed to allow stable measurement with respect to even a sample having an insulating surface which makes it difficult to perform a stable STM operation.

Figure 10:
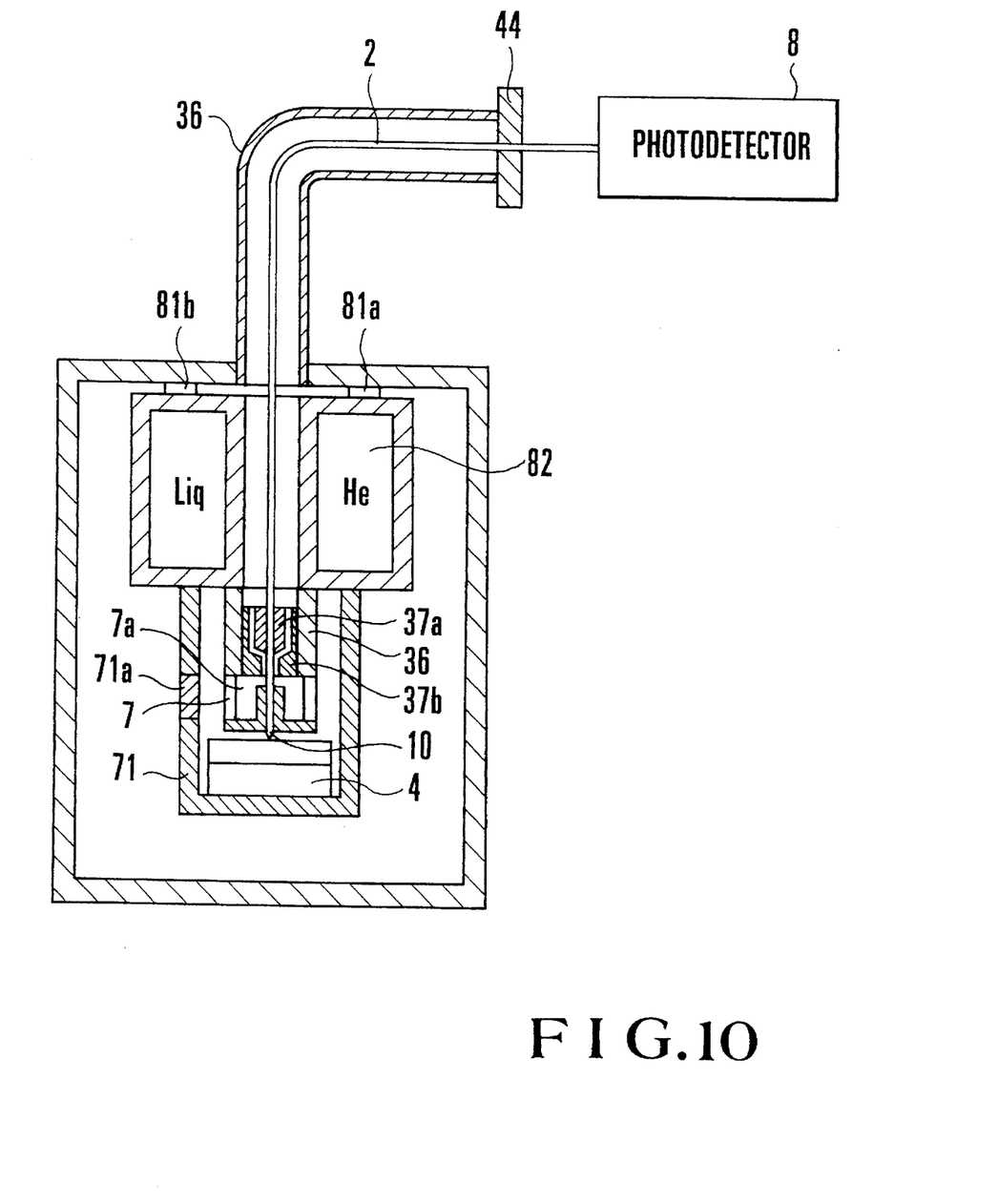

FIG. 10 shows still another embodiment of the present invention, which can be operated in an environment of an ultra-high vacuum or a very low temperature. The same reference numerals in FIG. 10 denote the same parts or parts having the same functions as in the above embodiments.

In emission spectrum measurement with respect to a semiconductor quantum structure, as the temperature of the sample decreases, the influence of thermal fluctuation on an emission spectrum is reduced, and the measurement precision is improved. In addition, some semiconductor quantum structure allows detection of luminescent only at a very low temperature. Therefore, an operation at a very low temperature is very important for a scanning tunneling microscope to improve the performance in measuring a semiconductor quantum structure. When the scanning tunneling microscope is to be operated at a very low temperature, contamination (freezing of a residual gas and the like) of a measurement portion (a sample and the probe) and external heat pose problems. When the measurement portion is contaminated, a change in tunnel current may occur irrelevantly to a sample, resulting in difficulty in accurate measurement. When external heat acts on the sample, the temperature of the sample is not decreased, or a drift in measurement position occurs, resulting in difficulty in accurate measurement. For this reason, a cooling means which can prevent an external gas and heat onto a measurement is required. As a cooling means, a method of dipping a measurement portion in a low-temperature liquid (e.g., a liquid helium) is available. In this method, however, it is relatively difficult to ensure high reliability of a driving mechanism for a sample or the probe and replace a sample and the probe. As a cooling method in which a measurement portion is not dipped in a liquid, a method of mounting a measurement portion on a cooling plate (cryostat) placed in an ultra-high vacuum is available. This method is relatively free from the problems posed in a liquid. In addition, in the open air, an insulating oxide film may be quickly formed on the surface of a semiconductor crystal, a crystal may deteriorate, or an STM operation may become difficult to perform. An operation in an ultra-high vacuum, however, can prevent such a problem. In this method, therefore, a measurement portion must be completely surrounded by the cryostat to prevent contamination of the measurement portion or external heat. In a conventional apparatus using a large lens or reflecting mirror as a light collecting means, a large window is required for a cryostat. A gas which is a cause for contamination or external heat may enter through the window.

In the embodiment shown in FIG. 10, in consideration of the above problems, a conductive light-collecting probe 10, a probe driving mechanism 7 including a probe holder 7a and an electrostrictive element such as a piezoelectric element, and a sample 4 are housed in a box-like cryostat 71 having no window. A portion of the cryostat 71 is a light-shielding cover 71a made of a material having a high thermal conductivity (a metal such as copper). Replacement of the probe 10 and the sample 4 is performed through this light-shielding cover 71a. During an operation, the light-shielding cover 71a is completely closed and cooled to the same temperature as that of the cryostat 71. Therefore, no external gas or heat enters the cryostat 71. The overall cryostat 71 is arranged in an ultra-high vacuum vessel 80.

Reference numerals 81a and 81b denote heat insulating members; and 82, a cooling tank containing liquid helium. The cooling tank 82 has a doughnut-like shape. The distal end of an optical fiber 2 housed in an elbow tube 36 is introduced into the cryostat 71 via a central hole in the cooling tank 82. As in the case shown in FIG. 5, a conical movable anchor spacer member 37a tapered toward its distal end is mounted on the distal end of the optical fiber 2 in the cryostat 71. This movable anchor spacer member 37a is housed in a bearing seat 37b in a slightly floating state. The distal end of the optical fiber 2 is abutted/joined again/to the proximal end of the probe 10. The probe 10 is supported by the inverted T-shaped probe holder 7a. The probe driving mechanism 7 constituted by a columnar piezoelectric element is arranged around the probe holder 7a. This piezoelectric element is of the type which can move the probe 10 three-dimensionally as disclosed in G. Binnig et al., "Single-Tube Three-Dimensional Scanner for Scanning Tunneling Microscopy", Rev. Scl. Instrum. 57(8), August 1988, pp. 1688–1689.

An optical transmission fiber extending from the proximal end of the conductive light-collecting probe 10 is introduced from the cryostat to a photodetection system in a room-temperature/open-air condition. Since no large lens or reflecting mirror is used, no window is required for the cryostat.

The operation of the apparatus of this embodiment will be described below.

The probe 10, the probe driving mechanism 7, the sample 4 are cooled to a very low temperature in the cryostat 71. With this structure, since the fiber is narrow, and the thermal conductivity is low, external heat entering the cryostat via the fiber can be reduced to a negligible level. Since the cryostat 71 has no window, entrance of external heat and gas onto the probe 10 and the sample 4 through a window can be prevented. In addition, since the cryostat 71 for housing the probe 10 and the sample 4 can be greatly decreased in size, a measurement portion can be set in a uniform low-temperature state within a short period of time. When the sample 4 is to be replaced, the probe 10 and the sample 4 are detached to be replaced with predetermined ones. Since the temperatures of the new probe 10 and the new sample 4 are higher than the temperature of the cryostat 71, a residual gas is trapped in the cryostat 71, and the measurement portion is free from contamination. Thereafter, the measurement portion reaches the same temperature as that of the cryostat 71 within a short period of time, thereby allowing an operation.

According to this embodiment, a tunneling microscope 100 using the conductive light-collecting probe 10 includes the sealed cooling means 71 containing the probe 10 and the sample 4 and the ultra-high vacuum means 80 to allow stable measurement at a very low temperature, thereby realizing high-precision optical evaluation of a semiconductor quantum structure and evaluation of a sample which allows detection of luminescence only at a very low temperature. In addition, according to the embodiment, the probe and a sample can be easily replaced without contamination in a cooled state.

Figure 11:
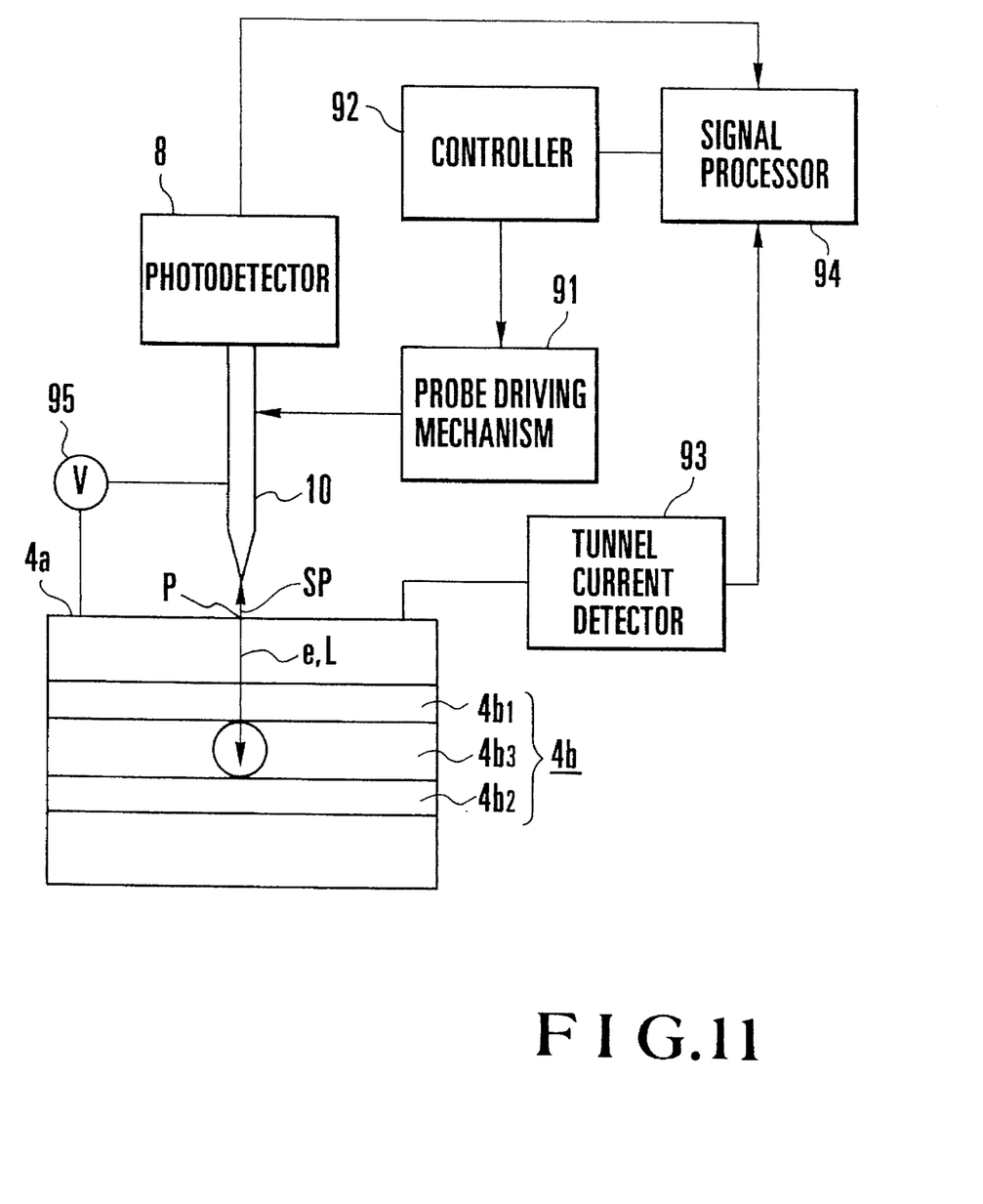

FIG. 11 shows still another embodiment of the present invention. The same reference numerals in FIG. 11 denote the same parts or parts having the same functions as in FIG. 1. Referring to FIG. 11, reference numeral 91 denotes a probe driving mechanism using, e.g., a piezoelectric element and serving to vertically move a probe 10; 92, a controller for controlling the probe driving mechanism 91; 93, a tunnel current detector connected to a surface 4a of a sample 4 and designed to detect a tunnel current produced upon injection of electrons e; and 94, a signal processor for performing signal processing, a display operation, and a recording operation on the basis of signals from the tunnel current detector 93 and a photodetector 8. Most of the functions of this signal processor are the same as those of the data processing/display unit in FIG. 1. Note that a quantum structure 4b constituted by upper and lower barrier well layers and an intermediate well layer is arranged in the sample 4 as in the case shown in FIG. 1.

The operation principle of a multilayer structure evaluating apparatus shown in FIG. 11 will be described below.

First of all, the probe 10 is placed near the surface 4a of the sample 4 to be spaced apart therefrom by a certain distance, and a variable bias source 95 applies a bias voltage between the probe 10 and the surface 4a of the sample 4 such that the probe 10 is set at a positive potential with respect to the surface 4a of the sample 4.

This bias voltage is adjusted to set injection energy within a range below the potential energy of a barrier layer 4b1. With this operation, a tunnel current e is injected from the tip of the probe 10 toward the surface 4a of the sample 4 via a space SP.

Most of the tunnel current injected into the sample 4 by the injection energy set by the bias voltage travels straight a ceratin distance within the sample 4 without losing any energy. An electron moving within this solid substance without losing any energy is called a ballistic electron. The mean value of distances that electrons travel without losing any energy is called a mean free path. If a quantum structure is present within the mean free path from the surface 4a of the sample 4, ballistic electrons reach the quantum structure 4b while keeping their injection energy unchanged. If the quantum structure 4b has an energy level which resonates with the ballistic electrons, the emission intensity increases. According to L. D. Bell and W. J. Kaiser, Phys. Rev. Let. 61, 2368 (1988), in a region where a potential change occurs (to be referred to as a potential boundary hereinafter), an electron whose traveling direction deviates from a line perpendicular to the potential boundary by a predetermined angle or more cannot pass through the potential boundary. Therefore, it can be considered that electrons which can pass through the potential boundary are ballistic electrons which have not undergone a scattering effect. The lateral spread of ballistic electrons passing through the potential boundary is very narrow, which can be decreased to a value on the nanometer order.

In the embodiment shown in FIG. 11, when the energy of ballistic electrons which are transmitted through the barrier layer 4b1 regarded as a potential boundary and have reached a well layer 4b3 of the quantum structure 4b coincides with the energy of electron-hole pairs, many electron-hole pairs are generated. The size of the region in which the electron/holes pairs are generated is as small as a value on the nanometer order, which is almost equal to the diameter of a ballistic electron beam. After forming excitons, the generated electron-hole pairs are recombined to emit light. The emission amount in this case is proportional to the number of electron-hole pairs generated by the ballistic electrons which have reached the well layer 4b3 of the quantum structure 4b. By measuring the relationship between the emission amount and the ballistic electron energy, the thickness of the well layer 4b3 of the quantum structure 4b can be measured.

A tunnel current is very sensitive to the state of the surface 4a of the sample 4, and greatly changes with a slight change in the surface state. This change is irrelevant to the quantum structure 4b of the sample 4 which is an object to be measured, and results in a measurement error. For this reason, in order to eliminate the influences of variations in tunnel current, the emission amount is normalized with the tunnel current and converted into an emission amount per unit tunnel current in the signal processor. This value will be referred to as a normalized emission intensity in the following description.

In the evaluation apparatus of this embodiment, electron-hole pairs are diffused in the quantum structure 4b by the time they emit light and extinct as in the case wherein the conventional PL or CL method is used. According to the evaluation apparatus of the embodiment, however, energy in a place where electron-hole pairs are generated is measured instead of measuring energy in a place where electron-hole pairs emit light after they are diffused as in the conventional CL method. Therefore, information about the quantum structure 4b at positions where electron-hole pairs are generated can be measured regardless of diffusion length.

The spread of positions where electron-hole pairs are generated almost coincides with the diameter of a ballistic electron beam. That is, the spread is on the nanometer order, which is very small as compared with the conventional PL or CL method. According to the evaluation apparatus of the present invention, since the influences of diffusion of electron-hole pairs can be eliminated, and the beam diameter can be reduced to a nanometer size, the final spatial resolution in measurement can be improved to the nanometer order.

The procedure for an evaluation method using the evaluation apparatus in FIG. 11 will be described next.

A procedure for obtaining the thickness of a well layer 4b2 in the quantum structure 4b will be described first.

The probe 10 is positioned to a measurement point P on the surface 4a of the sample 4, and the photodetector 8 such as a spectroscope is set so that it can detect light emitted from the sample 4. The injection energy for electrons is changed by controlling a bias voltage through the variable bias source 95, and an emission amount and an injected tunnel current are measured. With this operation, an emission intensity normalized by the signal processor 94 is obtained.

Subsequently, an emission amount and a tunnel current are measured for each injected energy while the injection energy is changed by controlling the bias voltage in the same manner, thereby obtaining the relationship between the normalized emission intensity and the injection energy.

The injection energy corresponding to the peak emission amount represents the thickness of the quantum structure 4b at the measurement point P. Therefore, the thickness of the well layer 4b2 of the quantum structure 4b at the measurement point P can be obtained.

When the spatial distribution of the thickness of the well layer 4b2 of the quantum structure 4b is to be measured, the bias voltage applied to the probe 10 is controlled by the variable bias source 95, and the electron injection energy is set to be a value corresponding to the energy confined in the quantum structure 4b as an object to be measured. Subsequently, upon reception of an operation command signal from the signal processor 94, the controller 92 drives the probe driving mechanism 91 in accordance with a plot control operation signal for the next measurement point, thereby moving the probe 10 to the next measurement point while keeping this injection energy.

At the next measurement point, an emission amount and a tunnel current are measured, and the emission amount is normalized with the tunnel current, thereby obtaining an emission intensity, as in the case of the measurement point P described above. Subsequently, a similar operation is performed at each measurement point. When emission intensities obtained in this manner, which are normalized in correspondence with the positions of the respective measurement points, are plotted and displayed, the spatial distribution of the thickness of the well layer $4b3$ of the quantum structure $4b$ of the sample 4 can be finally obtained.

The above embodiment has exemplified the evaluation of a semiconductor substrate having a quantum structure. However, the present invention can be equally applied to evaluation of other quantum structures, e.g., a quantum line structure and a quantum box structure, allowing evaluation with a higher precision than the prior art.

What is claimed is:

1. A scanning tunneling microscope comprising:
   a probe including a tip made of a sharpened light transparent material and arranged opposite a sample incorporating a quantum structure, and a light transparent electrode which covers a surface of the tip and is optically transparent;
   an optical waveguide having one end arranged on a proximal side of the tip;
   a photodetector, arranged on the other end of said optical waveguide, for detecting luminescence from the sample; and
   bias power supply for applying a bias voltage between said light transparent electrode and the sample, the power supply varying the bias voltage.

2. A microscope according to claim 1, wherein said light transparent electrode is constituted by a single metal thin film.

3. A microscope according to claim 1, wherein said light transparent electrode is constituted by a plurality of single metal thin films stacked on each other.

4. A microscope according to claim 1, further comprising a probe holder for detachably holding said probe.

5. A microscope according to claim 1, further comprising a probe driving mechanism for moving said probe.

6. A microscope according to claim 1, further comprising a data processing/display unit, connected to an output terminal of said photodetector, for processing/displaying measurement data.

7. A microscope according to claim 1, further comprising an optical fiber bent with a predetermined radius of curvature between said probe and said photodetector, and an elbow tube incorporating and holding said optical fiber.

8. A microscope according to claim 7, wherein said probe driving mechanism incorporates a piezoelectric element.

9. A microscope according to claim 1, wherein the sample and said probe are arranged in a sealed measurement chamber incorporating evacuation means.

10. A microscope according to claim 1, wherein the tip of said probe is substantially perpendicular to the sample.

11. A scanning tunneling microscope comprising:
    a probe including a tip made of a sharpened light transparent material and arranged opposite a sample incorporating a quantum structure, and a light transparent electrode which covers a surface of the tip and is optically transparent;
    an optical waveguide having one end arranged on a proximal side of the tip;
    a photodetector arranged on the other end of said optical waveguide, for detecting luminescence from the sample;
    an optical fiber bent with a predetermined radius of curvature between said probe and said photodetector, and an elbow tube incorporating and holding said optical fiber;
    bias power supply means for applying a bias voltage between said right transparent electrode and the sample;
    an anchor spacer arranged in said elbow tube on a photodetector side to fix a proximal end of said bent optical fiber;
    a movable anchor spacer arranged in said elbow tube to movably support a distal end of said bent optical fiber; and
    a bearing seat arranged in said elbow tube to receive said movable anchor spacer.

12. A microscope according to claim 11, wherein said bearing seat is made of an insulating material.

13. A scanning tunneling microscope comprising:
    a probe including a tip made of a sharpened light transparent material and arranged opposite a sample incorporating a quantum structure and a light transparent electrode which covers a surface of the tip and is optically transparent;
    an optical waveguide having one end arranged on a proximal side of the tip;
    a photodetector, arranged on the other end of said optical waveguide, for detecting luminescence from the sample; and
    bias power supply means for applying a bias voltage between said light transparent electrode and the sample;
    wherein the sample and said probe are arranged in a sealed measurement chamber incorporating cooling and evacuation means for cooling the sample and maintaining the sample in a vacuum, respectively.

14. A measurement method comprising the steps of:
    using a scanning tunneling microscope including
    a probe having a tip made of a sharpened light transparent material and arranged opposite a sample, and a light transparent electrode which covers a surface of the tip and is optically transparent,
    an optical waveguide having one end arranged on a proximal side of the tip,
    a photodetector, arranged on the other end of said optical waveguide, for detecting luminescence from the sample, and
    bias power supply means for applying a bias voltage between said light transparent electrode and the sample, the power supply means varying the bias voltage;
    causing a tunnel current to flow in the sample by applying a bias voltage from said bias power supply means to a portion between said light transparent electrode and the sample while the tip is set to oppose the same perpendicularly; and
    guiding luminescence caused by the quantum structure, which has received the tunnel current, from the tip of said probe to said photodetector via said probe.

15. A measurement method comprising the steps of:
    using a scanning tunneling microscope including
    a probe having a tip made of a sharpened light transparent material and arranged opposite a semiconductor substrate having a multilayer structure, and a light transparent electrode which covers a surface of the tip and is optically transparent,
    an optical waveguide having one end arranged on a proximal side of the tip,
    a photodetector, arranged on the other end of said optical waveguide, for detecting luminescence from the semiconductor substrate, and
    bias power supply means for applying the bias voltage between said light transparent electrode and the semiconductor substrate;

causing a tunnel current to flow in the semiconductor substrate by applying the bias voltage between said light transparent electrode and the semiconductor substrate while the tip is set to oppose the same perpendicularly;

guiding luminescence caused by the semiconductor structure, which has received the tunnel current, from the tip of said probe to said photodetector via said probe;

injecting electrons having different energies into the sample by using a tunnel current;

measuring a value of a current injected into the semiconductor substrate for each injection energy; and dividing an emission amount obtained for each injection energy by the corresponding current injected into the semiconductor substrate, thereby measuring emission intensities from a quantum structure at different depths.

16. A measurement method comprising the steps of:

using a scanning tunneling microscope including a probe having a tip made of a sharpened light transparent material and arranged opposite a semiconductor substrate having a multilayer structure, and a light transparent electrode which covers a surface of the tip and is optically transparent, an optical waveguide having one end arranged on a proximal side of the tip, a photodetector, arranged on the other end of said optical waveguide, for detecting luminescence from the semiconductor substrate, and bias power supply means for applying the bias voltage between said light transparent electrode and the semiconductor substrate;

causing a tunnel current to flow in the semiconductor substrate by applying the bias voltage between said light transparent electrode and the semiconductor substrate while the tip is set to oppose the same perpendicularly;

guiding luminescence caused by the quantum structure, which has received the tunnel current, from the tip of said probe to said photodetector via said probe;

injecting electrons having different energies into the sample by using a tunnel current while an injection point is changed, dividing an emission amount at each injection point by a value of a corresponding current injected into the semiconductor substrate for each injection energy, thereby measuring emission intensities from the quantum structure at different depths, and displaying the obtained emission intensity in correspondence with each injection point, thereby measuring a spatial distribution of thicknesses of the quantum structure of said semiconductor substrate.

17. A scanning tunneling microscope comprising:

an optical fiber having a sharp tip on one end;

a light transparent electrode covering a surface of the tip, the electrode having at least one metal thin film over an indium oxide coating; and electron injection means for producing a potential difference between said light transparent electrode and a sample, wherein luminescence caused in a quantum structure incorporated in the sample by injection energy of electrons injected into the sample by said electron injection means is guided from said light transparent electrode into said optical fiber.

18. A probe comprising a tip made of a sharpened light transparent material and arranged opposite and perpendicular to a sample incorporating a quantum structure, and an optically transparent electrode having an indium oxide layer and a thin metal film layer covering a surface of the tip.

19. A probe according to claim 18, wherein said tip is formed on a distal end of a probe base member made of a light transparent material.

20. A probe according to claim 18, wherein said tip is supported by a cantilever.

21. A scanning tunneling microscope comprising:

a probe including a tip made of a sharpened light transparent material and arranged opposite a sample incorporating a quantum structure, and a light transparent electrode having a layer of indium oxide and a single metal thin film layer;

an optical waveguide having one end arranged on a proximal side of the tip;

a photodetector, arranged on the other end of the said optical waveguide, for detecting luminescence from the sample; and bias power supply means for applying a bias voltage between said light transparent electrode and the sample.

22. A microscope according to claim 21 wherein said single metal thin film covers only a portion of the indium oxide which corresponds to a vertex portion of the light transparent material.

23. A scanning tunneling microscope comprising:

a probe including a tip made of a sharpened light transparent material and arranged opposite a sample incorporating a quantum structure, a light transparent electrode covering a surface of the tip, a probe base member continuous with the tip, and a conductive thick film arranged around the probe base member;

an optical waveguide having one end arranged on a proximal side of the tip;

a photodetector, arranged on the other end of said optical waveguide for detecting luminescence from the sample; and bias power supply means for applying a bias voltage between said light transparent electrode and the sample.

24. A microscope according to claim 23, wherein the conductive thick film has a thickness of 150 μm.

25. A microscope according to claim 23, wherein said conductive thick film is a plated conductive thick film.

26. A microscope according to claim 23, further comprising a probe holder for detachably holding said probe.

27. A microscope according to claim 26, wherein said probe holder further comprises means for fixing said probe by mechanically pressing said probe downward from said conductive thick film.

* * * * *